(12) United States Patent
Nogayama et al.

(10) Patent No.: US 10,540,379 B2
(45) Date of Patent: Jan. 21, 2020

(54) SEARCHING BASE ENCODED TEXT

(71) Applicant: International Business Machines Corporation, Armonk, NY (US)

(72) Inventors: Takahide Nogayama, Yokohama (JP); Daisuke Mogi, Tokyo (JP); Takeshi Kubota, Tokyo (JP); Hideki Inomata, Tokyo (JP); Yu Ito, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 15/837,206

(22) Filed: Dec. 11, 2017

(65) Prior Publication Data

US 2019/0179952 A1 Jun. 13, 2019

(51) Int. Cl.
*G06F 16/33* (2019.01)
*G06F 17/22* (2006.01)
*H04L 29/06* (2006.01)

(52) U.S. Cl.
CPC ........ *G06F 16/334* (2019.01); *G06F 17/2217* (2013.01); *H04L 63/1416* (2013.01)

(58) Field of Classification Search
CPC .............................. G06F 17/30; G06F 16/334
USPC .......................................................... 707/693
See application file for complete search history.

(56) References Cited

U.S. PATENT DOCUMENTS

| | | | | |
|---|---|---|---|---|
| 5,398,027 A * | 3/1995 | Ooi | ....................... | H03M 7/425 341/106 |
| 8,793,488 B1 * | 7/2014 | Forristal | ............. | H04L 63/0281 709/201 |
| 2010/0296745 A1 * | 11/2010 | Strom | .................. | H04N 19/176 382/233 |
| 2011/0320906 A1 * | 12/2011 | Murakami | ......... | H03M 13/1111 714/752 |
| 2014/0301450 A1 * | 10/2014 | Alshina | ................ | H04N 19/176 375/240.03 |
| 2015/0248432 A1 * | 9/2015 | Kataoka | .............. | H03M 7/3086 707/693 |

(Continued)

FOREIGN PATENT DOCUMENTS

| | | |
|---|---|---|
| CN | 101577703 A | 11/2009 |
| CN | 106649217 A | 5/2017 |

OTHER PUBLICATIONS

Bartel et al., "XML Signature Syntax and Processing Version 1.1", W3C Recommendation Apr. 11, 2013, 56 pages, <https://www.w3.org/TR/xmldsig-core/>.

(Continued)

*Primary Examiner* — Giovanna B Colan
(74) *Attorney, Agent, or Firm* — Stephen R. Yoder

(57) ABSTRACT

A method, executed by one or more processors, includes receiving a first bit sequence corresponding to source data having a source encoding bit-length (BLS), generating one or more additional bit sequences by shifting the first bit sequence by shift lengths that are equal to a multiple of the source encoding bit-length, partitioning the first bit sequence and the one or more additional bit sequences according to a target encoding bit-length (BLT) to provide a plurality of target encoding search patterns, and searching a target character string encoded with the target encoding using the plurality of target encoding search patterns. A computer system and computer program product corresponding to the above method are also disclosed herein.

20 Claims, 11 Drawing Sheets

(56) References Cited

U.S. PATENT DOCUMENTS

2018/0076929 A1* 3/2018 Zhang .................. H03M 13/11

OTHER PUBLICATIONS

Cannell, Joshua, "Obfuscation: Malware's best friend", Malewarebyestes Labs, last updated Mar. 31, 2016, 4 pages, <https://blog.malewarebyes.com/threat-analysis/2013/03/obfuscation-malewares-best-friend/>.

Cruz, Macky, "3) Hiding in an invading network and making an attack tenaciously—Knowing persistent targeted attacks", Trend Micro, powered by TrendLabs, Posted on: Aug. 15, 2012, 5 pages, <https://translate.googleusercontent.com/translate_c?depth=1&hl=j . . . micro.com.jp/archives/5766&usg=ALKJrhhC8EgtGwulSVv-CogAEBHKgYlvQg>.

Cutrell, Jonathan, "Base What? A Practical Introduction to Base Encoding", Oct. 15, 2012, 13 pages, <https://code.tutsplus.com/tutorials/base-what-a-practical-introduction-to-bse-encoding--net-27590>.

Imamura et al., "XML Encryption Syntax and Processing Version 1.1", U3C Recommendation Apr. 11, 2013, 52 pages, <https://www.w3.org/TR/xmlenc-core/>.

Josefsson, S., "The Base16, Base32, and Base64 Data Encodings", Network Working Group, Category: Standards Track, SJD, Oct. 2006, 18 pages.

Kepner et al., "Computing on Masked Data: a High Performance Method for Improving Big Data Veracity", MIT Lincoln Laboratory, Lexington, MA, U.S.A., printed on Sep. 18, 2017, 6 pages.

Masinter, L., "The "data" URL scheme", Network Working Group, Category: Standards Track, Xerox Corporation, Aug. 1998, 4 pages.

Wikipedia, "Base64", From Wikipedia, the free encyclopedia, This page was last edited on Nov. 11, 2017, 11 pages, <https://en.wikipedia.org/wiki/Base64#Variants-summary-table>.

Xu, He, "Darkness Still Lurks", Jun. 19, 2014, Fortinet Blog, 4 pages, <https://blog.fortinet.com/2014/06/19/darkness-still-lurks>.

"Examples of malicious php code—Aw Snap", Jun. 28, 2017, Redleg Home, 11 pages, <https://aw-snap.info/articles/php-examples.php>.

"uuencode", uuencode—encode a binary file, Jun. 28, 2017, The Open Group Base Specifications Issue 7, IEEE Std 1003.1-2008, 2016 Edition, Copyright © 2001-2016 The IEEE and The Open Group, 6 pages, <http://pubs.opengroup.org/onlinepubs/96999919799/utilties/uuencode.html>.

Mell et al., "The NIST Definition of Cloud Computing", NIST National Institute of Standards and Technology, U.S. Department of Commerce, Special Publication 800-145, Sep. 2011, 7 pages.

* cited by examiner

```
<!DOCTYPE html>
<html>
   <head>
      <style>
         body {
            background: white url('data:image/png;base64,YW5kIDE9MQ...');
         }
...
   <script type="text/javascript">eval(decode64('YW5kIDE9MQ...'));</script>
...
   <?php ... eval(base64_decode('YW5kIDE9MQ...')) ... ?>
...
   <img src="data:image/png;base64,YW5kIDE9MQ..." >
...

</html>
```

FIG. 1A

```
MIME-Version: 1.0
From: Takahide Nogayama <nogayama@xyz.com>
Date: Tue, 4 Apr 2017 15:48:44 +0900
Subject: Sending file
To: nogayama@abc.com

...

--001a113de4f6cc09b4054c51aa24
X-Attachment-Id: f_j136ojgr0
Content-Type: application/zip; name="hello.zip"
Content-Disposition: attachment; filename="hello.zip"
Content-Transfer-Encoding: base64

YW5kIDE9MQ...

--001a113de4f6cc09b4054c51aa24--
```

FIG. 1B ewogICAiZGVmYnJvd3NlciIgOiAiY2hyb21lLmV4
ZSIsCiAgICJkc3Rjb3VudCIgOiAxMSwKICAgImljb
25zdGF0dXNhcnJheSIgOiBudWxsLAogICAicHJv
Y2Vzc2NudCIgOiA3Mgp9Cg==

```
{
  "defbrowser" : "chrome.exe",
  "dstcount" : 11,
  "iconstatusarray" : null,
  "processcnt" : 72
}
```

FIG. 1C

BLT: 6
BLS: 8

Search string "and 1=1"

```
R: 4, patterns : [
   { P:    0,
     pattern: YW5kIDE9M[QRSTUVWXYZabcdef]
   },
   { P:    1,
     pattern: [GWm2]FuZCAxPT[EFGH]
   },
   { P:    2,
     pattern: [BFJNRVZdhlptx159]hbmQgMT0x
   },
]
```

SEARCHING BASE ENCODED TEXT

BACKGROUND OF THE INVENTION

The present invention relates generally to the field of data searching, and more particularly to searching for content in base-encoded text.

Base-encodings including the base64 family and uuencode, are very widely used to represent content within text-based streams and documents. Examples include files attached to email messages, images and fonts embedded in HTML and CSS documents as well as signature hashes and encrypted data in XML files.

SUMMARY

A method, executed by one or more processors, includes receiving a first bit sequence corresponding to source data having a source encoding bit-length (BLS), generating one or more additional bit sequences by shifting the first bit sequence by shift lengths that are equal to a multiple of the source encoding bit-length, partitioning the first bit sequence and the one or more additional bit sequences according to a target encoding bit-length (BLT) to provide a plurality of target encoding search patterns, and searching a target character string encoded with the target encoding using the plurality of target encoding search patterns. A computer system and computer program product corresponding to the above method are also disclosed herein.

BRIEF DESCRIPTION OF THE DRAWINGS

FIGS. 1A, 1B and 1C are text diagrams depicting various examples of text encoded content in accordance with at least one embodiment of the present invention;

FIGS. 4A-4D are text diagrams depicting one example of searching for text encoded data at various stages of processing in accordance with at least one embodiment of the present invention;

DETAILED DESCRIPTION

The embodiments disclosed herein recognize that base-encodings may be used to obfuscate malicious activities. For example, malicious code may be embedded in PHP or JavaScript code fragments. The embodiments disclosed herein also recognize that decoding base-encoded text requires considerable processing and storage capabilities. Typically, multiple syntax analysis libraries corresponding to different document formats are required. For example, text generated from base-encoded data may be embedded in MIME documents, HTML documents, XML documents, URLs, CSS codes, JavaScript codes, and PHP codes.

To decode and search the encoded data, the encoded data must be extracted from the document. In a device which does not have syntax analysis libraries for those data formats, e.g., an IDS/ISP, proxy, or network switch, the location of the encoded data in the document cannot be identified. In those situations, the extraction of the encoded data is problematic. Furthermore, using conventional approaches, it is also not practical to search for base-encoded data if it is embedded in a document with an unknown format.

Various embodiments, that address at least some of the above issues, are disclosed herein and will now be described in reference to the Figures.

FIGS. 1A, 1B and 1C are text diagrams depicting various examples of text encoded content in accordance with at least one embodiment of the present invention. The depicted examples show that text encoded content can be used to represent a variety of content types such as images and scripts that are embedded in text-based documents such as web pages, XML documents, and the like. The text encoded content may comprise binary data or source text. The source text may be encoded with a different encoding than used in the text-based document.

In FIGS. 1A and 1B the text encoded content includes the string pattern "YW5kIDE9MQ". However, in a situation where malicious content is intended to go unnoticed, the text encoded content may be shifted by one or more symbols in the source encoding domain resulting in a variety of possible string patterns. Rather than decoding each instance of text encoded content to detect the malicious content, the present invention enables generation of a minimal set of string patterns that covers each possible instance of symbol shifting. The patterns may then be used by conventional text search engines, including regular expression search engines such as grep, to detect the malicious content in the text-based document.

Figure 2:
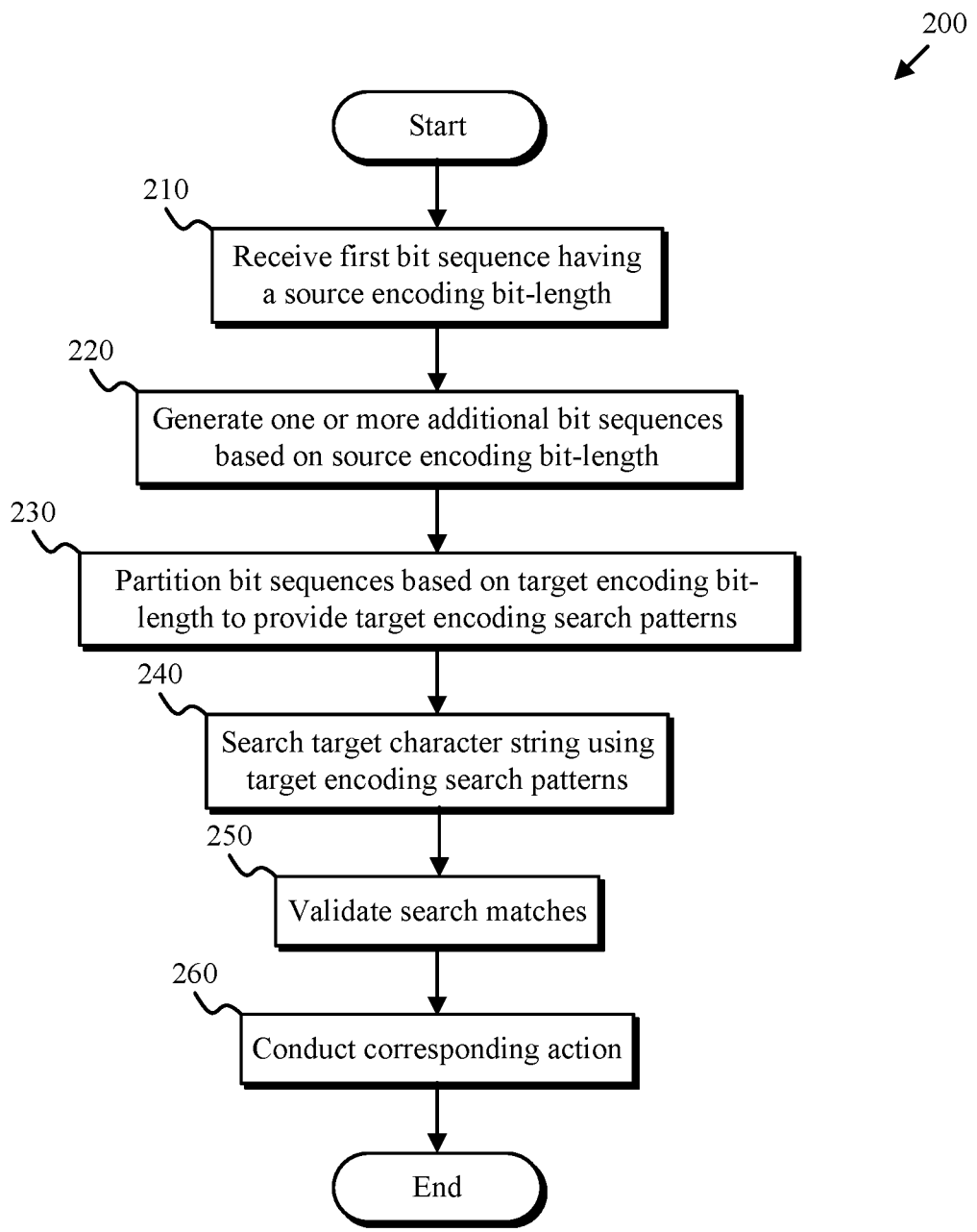
FIG. 2 is a flowchart depicting one example of an encoded content search method in accordance with at least one embodiment of the present invention.

FIG. 2 is a flowchart depicting one example of an encoded content search method 200 in accordance with at least one embodiment of the present invention. As depicted, the encoded content search method 200 includes receiving (210) a first bit sequence, generating (220) one or more additional bit sequences, partitioning (230) the bit sequences to provide a set of search patterns, searching (240) a target character string, validating (250) search matches and conducting (260) a corresponding action. The encoded content search method 200 is conducted by a processor associated with a computer such as the computer 500.

Receiving (210) a first bit sequence may include receiving a bit sequence corresponding to source data that has a source encoding bit-length (BLS). The source data may be data (e.g., content) that is to be searched for within an encoded text field or document.

Generating (220) one or more additional bit sequences may include generating one or more additional bit sequences by shifting the first bit sequence by shift lengths that are equal to a multiple of the source encoding bit-length BLS.

Partitioning (230) the bit sequences to provide a set of search patterns may include partitioning the first bit sequence and the additional bit sequences according to a target encoding bit-length (BLT) to provide a set of target encoding search patterns. In one embodiment the set of target encoding search patterns comprises P patterns where P is equal to a least common multiple of BLS and BLT divided by BLS, namely:

$$P = LCM(BLS, BLT)/BLS \quad (1)$$

In some embodiments, "wildcard" characters are generated for each of the additional bit sequences that correspond to situations where the bit partitioning does not align with the target encoding. The "wildcard" characters indicate the possible start characters and terminal characters that are consistent with the searched for source data. In some embodiments, the start characters (if any) are prepended to a corresponding target encoding search pattern and the terminal characters (if any) are appended to a corresponding target encoding search pattern.

Searching (240) a target character string may include searching a target character string encoded with the target encoding using the set of target encoding search patterns. In some embodiments, searching is accomplished by invoking a regular expression search engine.

Validating (250) search matches may include determining whether the search results are consistent. In some embodiments, a starting position (I) for each match within the target character string is validated via a confirmation equation. In one embodiment, the confirmation equation is:

$$(((I-P) \bmod R)=0) \qquad (2)$$

where R is equal to the least common multiple of BLS and BLT divided by BLT, i.e.:

$$R=LCM(BLS,BLT)/BLT \qquad (3)$$

If the confirmation equation is true, the search match is considered valid. If the confirmation equation is not true, the search match is considered invalid.

Conducting (260) a corresponding action may include one or more of informing a user or an administrator that a match was found, and quarantining and/or blocking a executable.

Figure 3:
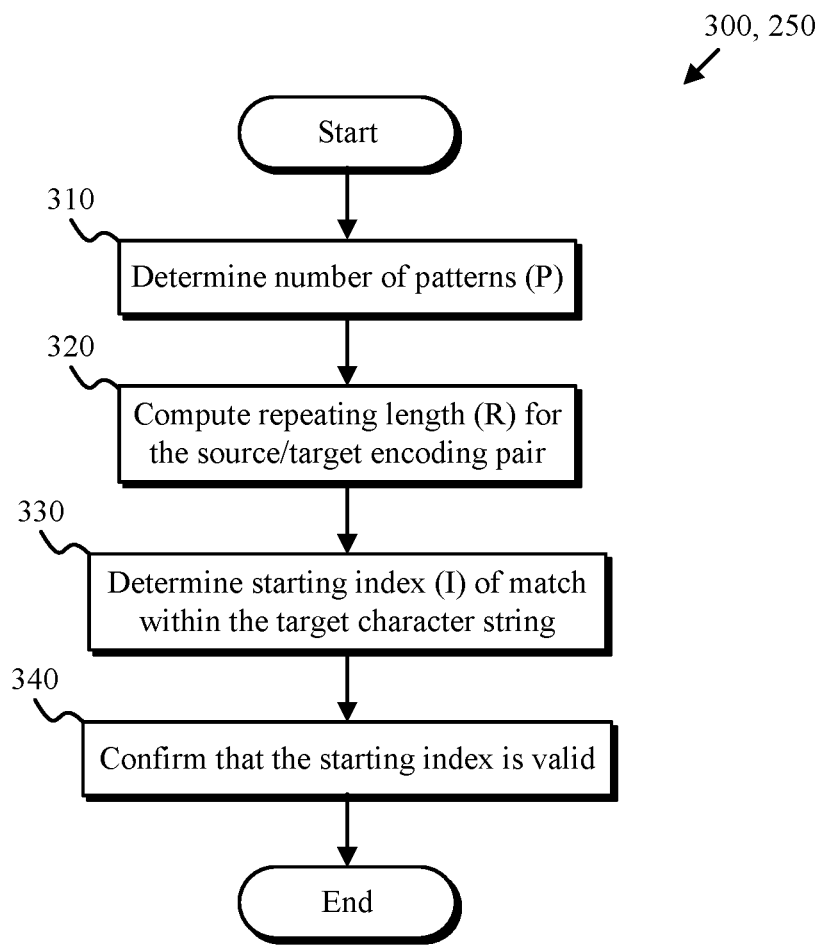
FIG. 3 is a flowchart depicting one example of a search validation method in accordance with at least one embodiment of the present invention.

FIG. 3 is a flowchart depicting one example of a search validation method 300 in accordance with at least one embodiment of the present invention. As depicted, the search validation method 300 includes determining (310) a number of patterns (P), computing (320) a repeating length (R) for the source/target encoding pair, determining (330) a starting index (I) of a match and confirming (340) that the starting index (I) is valid.

Determining (310) a number of patterns (P) may include computing the number of patterns (P) according to equation (1). Similarly, computing (320) a repeating length (R) for the source/target encoding pair may include computing (R) according to equation (3). Determining (330) a starting index (I) of a match may include using an index returned by a search engine for a match between one or more search patterns and a target character string. Confirming (340) that the starting index (I) is valid may include confirming that equation (2) is true. If equation (2) is confirmed, the method returns a positive result. If equation (2) is not confirmed, the method returns a negative result.

Figure 4B:
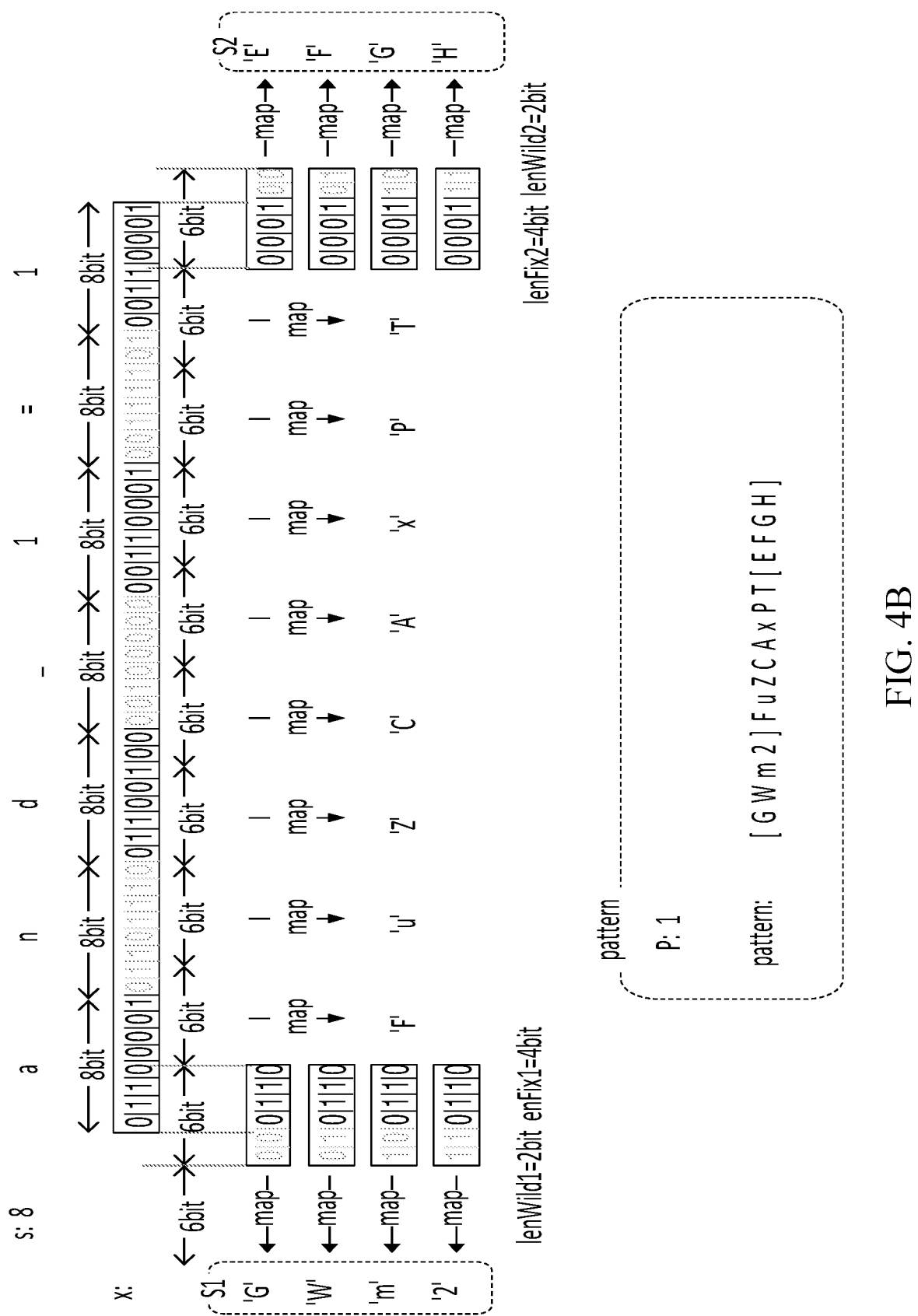

FIGS. 4A-4D are text diagrams depicting one example of searching for text encoded data at various stages of processing in accordance with at least one embodiment of the present invention. As shown in FIG. 4A, the bit-length of the source encoding (BLS) in the depicted example is 8 bits and the bit-length of the target encoding (BLT) is 6 bits. The number of patterns (P) is computed according to equation (1) as P=LCM(8,6)/8=24/6=3 patterns. Similarly, the repeating length (R) for the source/target encoding pair is computed according to equation (3) as R=LCM(8,6)/6=24/6=4 symbol shifts. By conducting the method 200 or the like, the three search patterns depicted in FIG. 4A are generated including initial and/or terminal ("wildcard") character sets enclosed within square brackets.

Figure 4C:
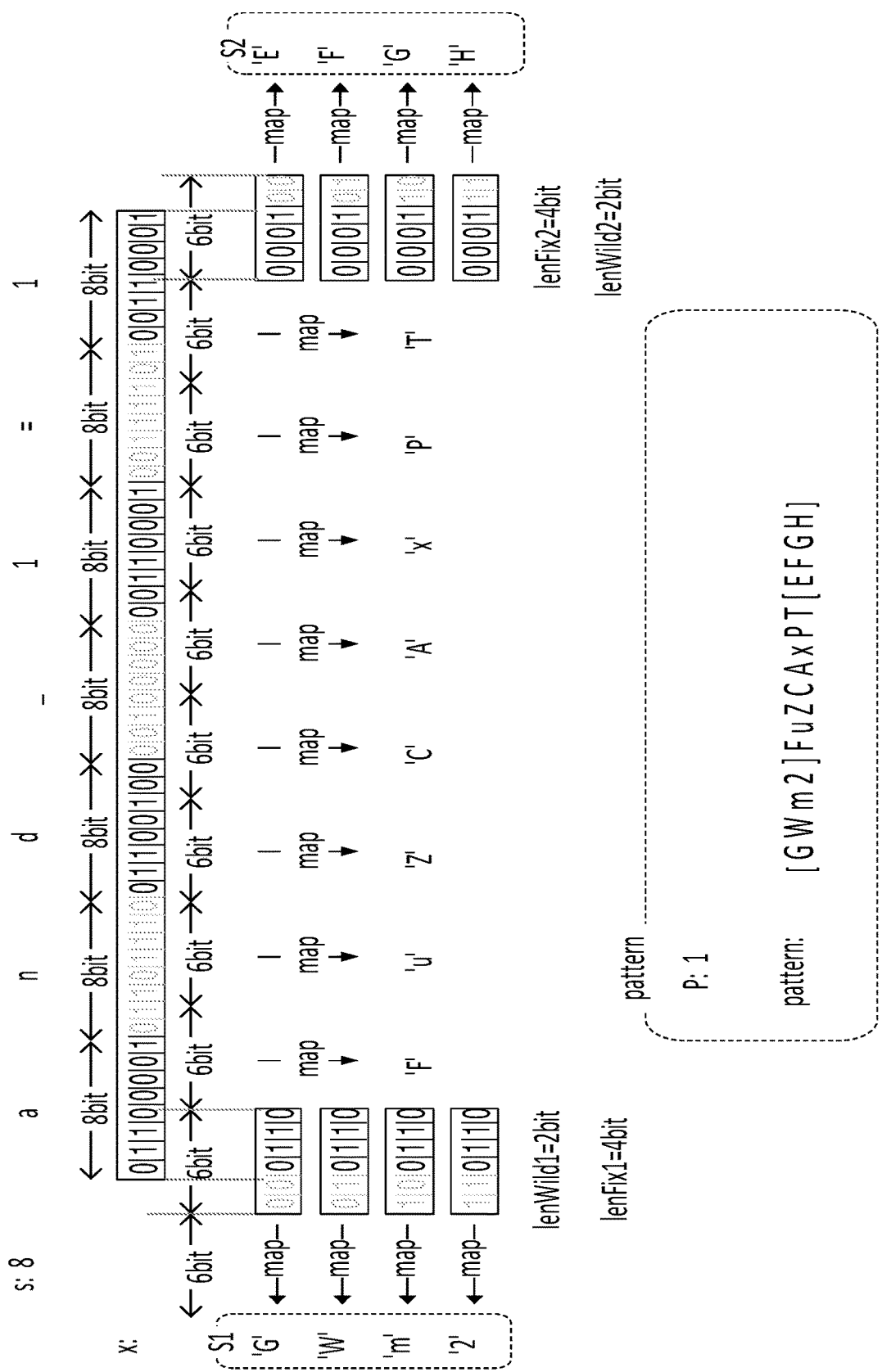
Figure 4D:
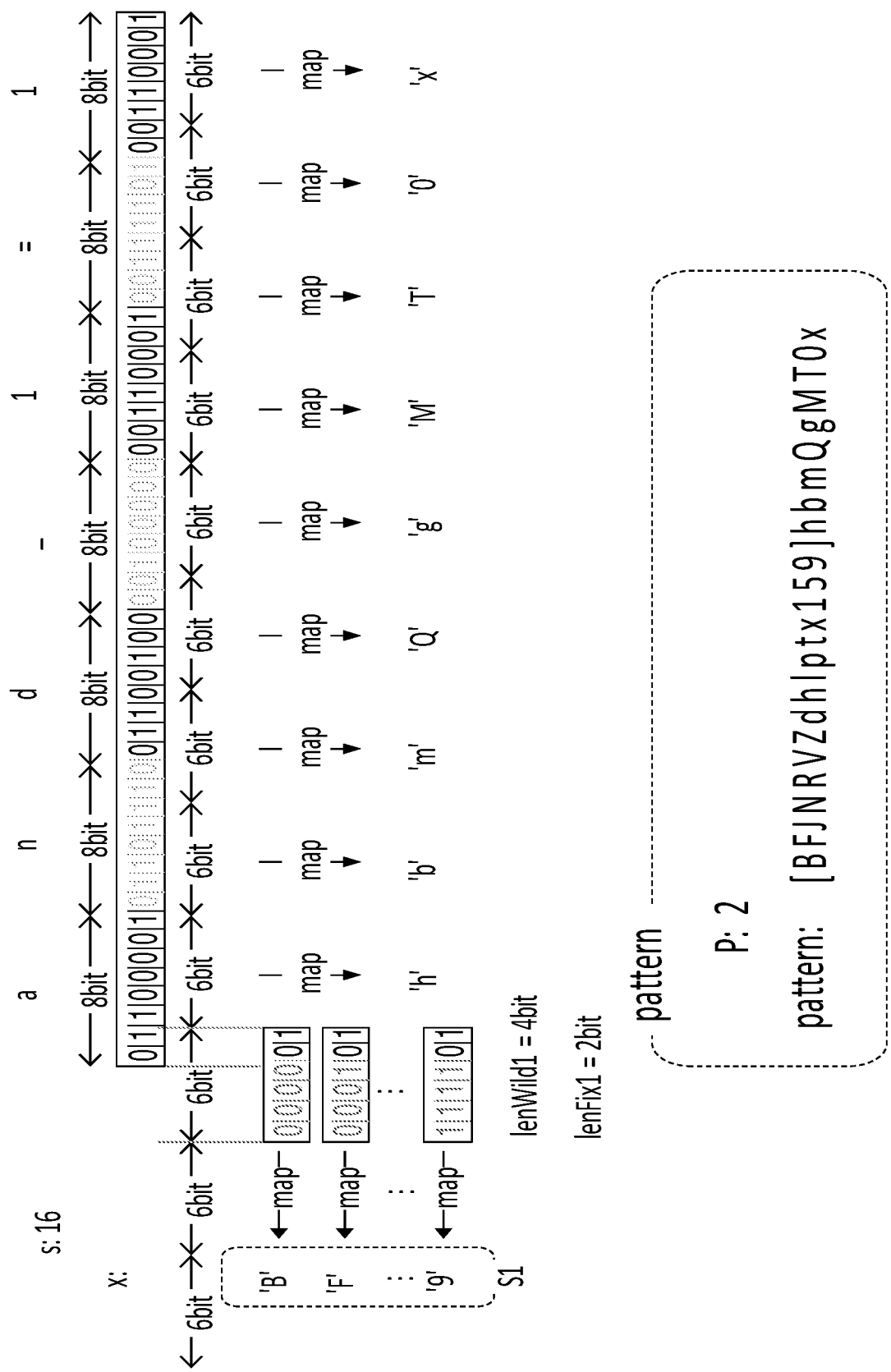

FIGS. 4B-4D show additional details on how the search patterns shown in FIG. 4A may be generated. FIG. 4B shows that an un-shifted bit sequence corresponding to the ASCII text sequence "and 1=1" may be partitioned at 6 bit boundaries associated with the base64 encoding to produce a first base64 pattern including the terminal character set "QRSTUVWXYZabcdef" enclosed within square brackets.

As shown in FIG. 4C, the bit sequence corresponding to the ASCII text sequence "and 1=1" is shifted by 8 bits (one ASCII character) and partitioned at 6 bit boundaries to produce a second base64 pattern including the start character set "GWm2" and the terminal character set "EFGH" enclosed within square brackets. As shown in FIG. 4D, the bit sequence corresponding to the ASCII text sequence "and 1=1" is shifted by 16 bits (two ASCII characters) and partitioned at 6 bit boundaries to produce a third base64 pattern including the start character set "BFJNRVZdhlptx159".

One of skill in the art will appreciate that at least some of the embodiments disclosed herein enable high-speed searching for a re-encoded data with a small amount of memory. Furthermore, a regular expression search engine may be leveraged. Additionally, it is not necessary to find out the position of a base-encoded character string. Thus, syntax analyzers for HTML/CSS/JS/MIME are not necessary. Consequently, the re-encoded data can be found even when the searched for data is embedded in a document with an unknown document format. Furthermore, network devices such as an IDS/IPS, Proxy, or network switches can check specific data within network traffic streams obfuscated by base-encoding. A wide variety of base-encodings such as Base64, uuencode, Base16, and Base32 are supported.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
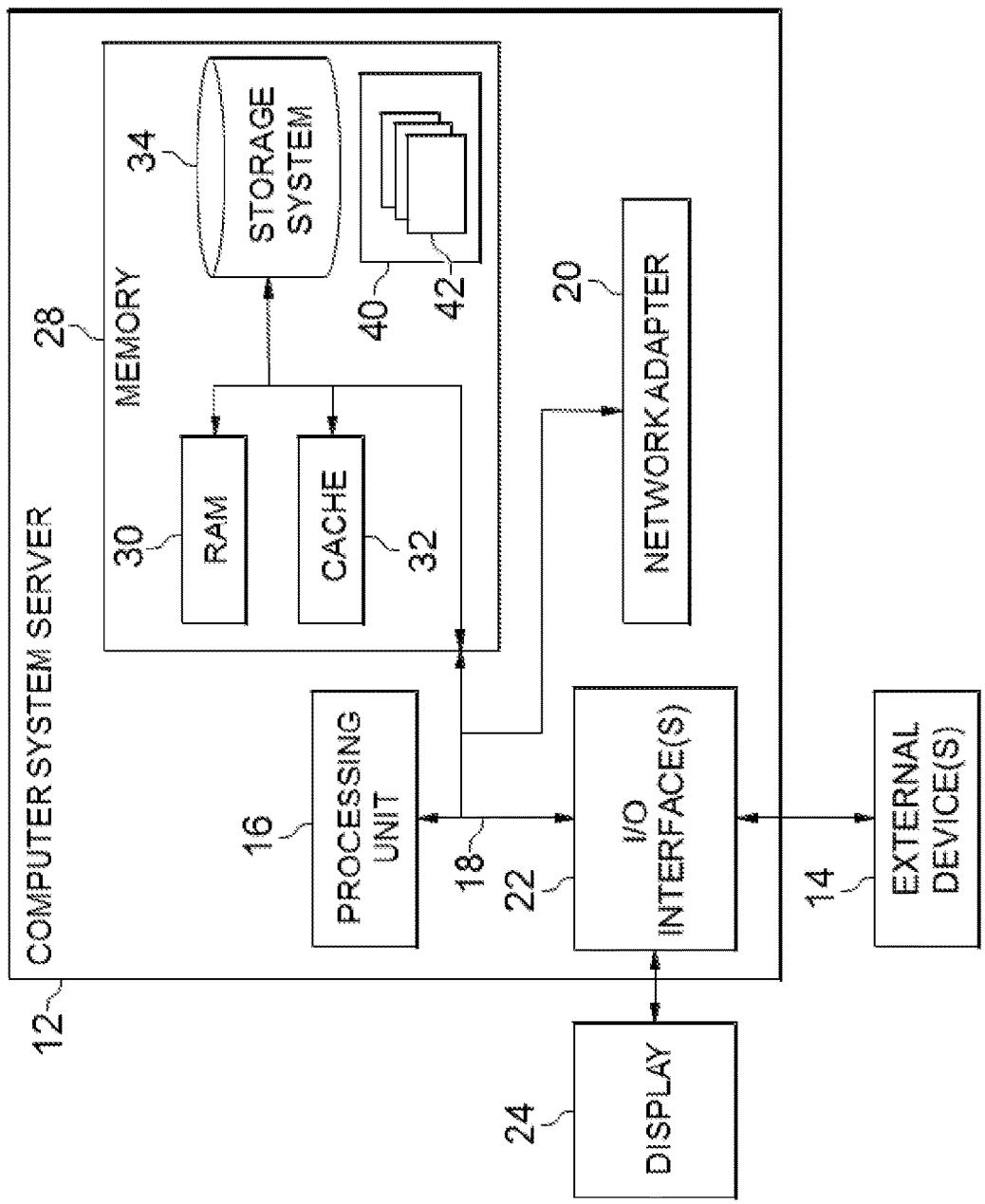
FIG. 5 is a block diagram depicting one example of a computing apparatus (e.g., cloud computing node) suitable for executing the methods disclosed herein.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
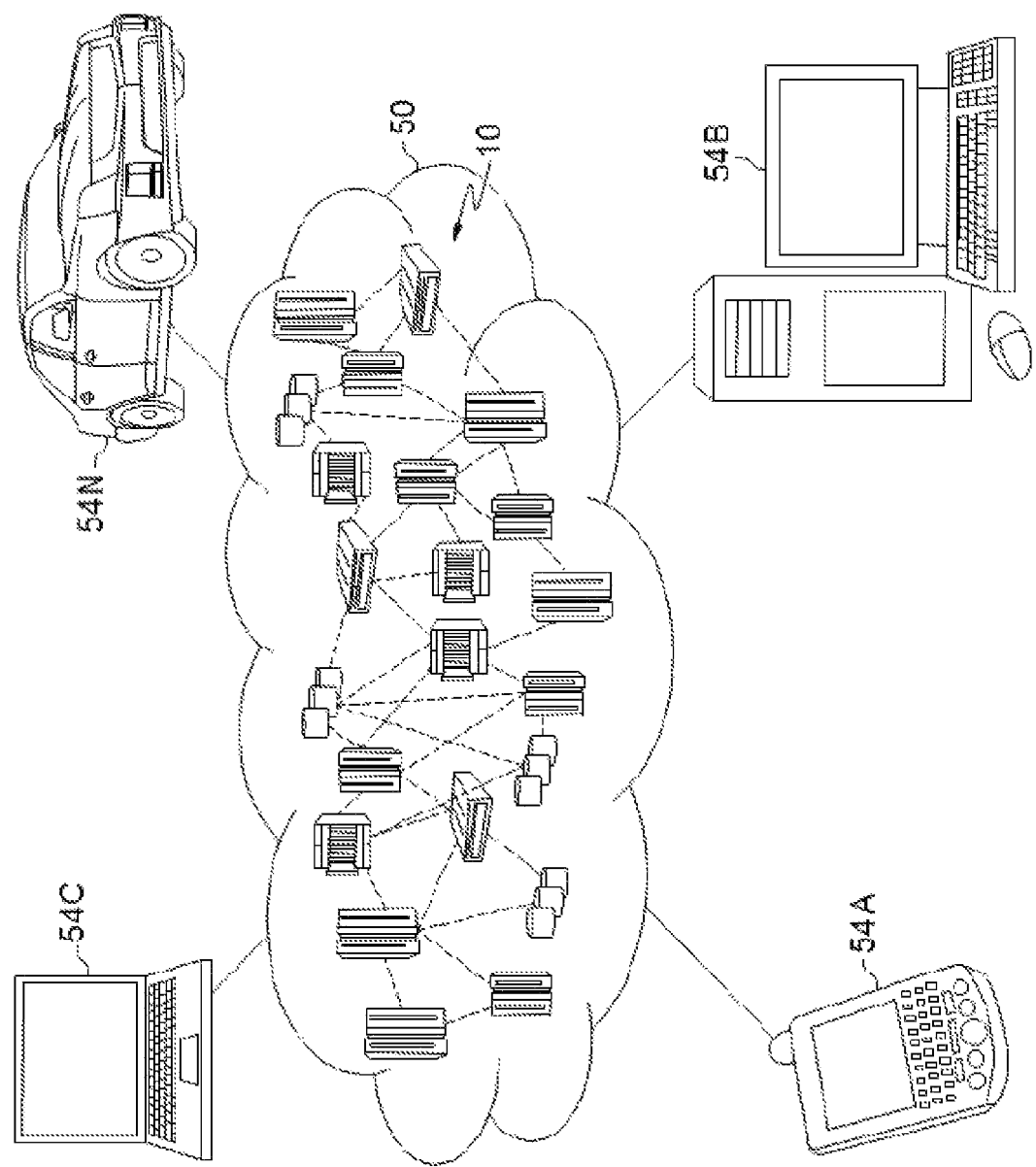
FIG. 6 depicts a cloud computing environment in accordance with to at least one embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
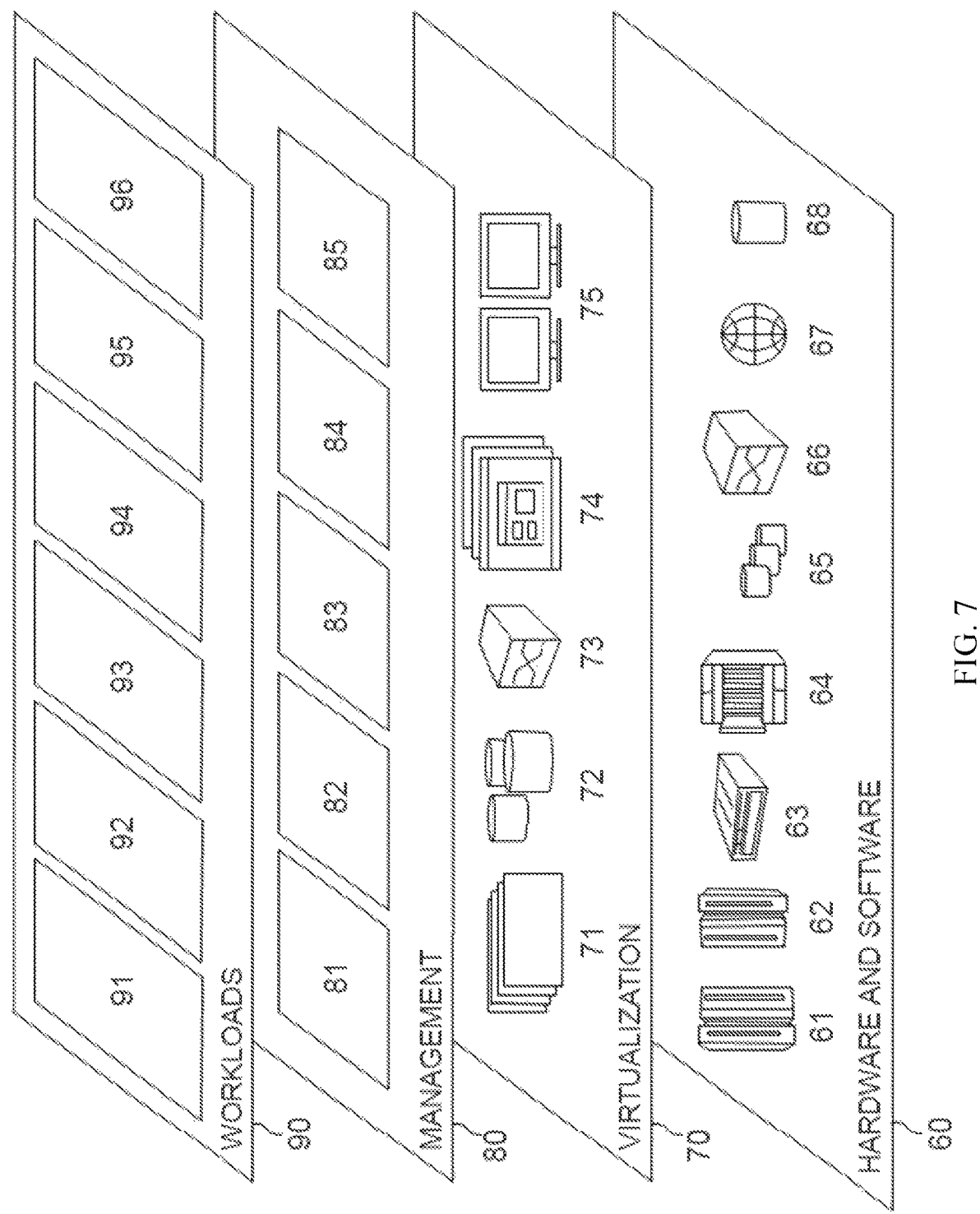
FIG. 7 depicts abstraction model layers in accordance with at least one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method, executed by one or more processors, the method comprising:
   receiving a first bit sequence corresponding to source data, having a source encoding bit-length (BLS);
   generating one or more additional hit sequences by shifting the first hit sequence by shift lengths that are equal to a multiple of the source encoding bit-length;
   partitioning the first bit sequence and the one or more additional bit sequences according to a target encoding bit-length (BLT) of a target encoding to provide a plurality of target encoding search patterns; and
   searching a target character string encoded with the target encoding using the plurality of target encoding search patterns.

2. The method of claim 1, wherein the plurality of target encoding search patterns comprises P patterns.

3. The method of claim 1, wherein P is equal to a least common multiple of BLS and BLT divided by BLS.

4. The method of claim 1, further comprising validating a search match.

5. The method of claim 4, wherein validating the search match comprises determining a starting position (I) for the search match.

6. The method of claim 5, wherein validating the search match comprises confirming that a confirmation equation is true.

7. The method of claim 6, wherein the confirmation equation is $(((I-P) \bmod R)=0)$, where R is equal to a least common multiple of BLS and BLT divided by BLT, namely R=LCM(BLS,BLT)/BLT.

8. The method of claim 1, further comprising generating a plurality of wildcard characters for each of the one or more additional bit sequences.

9. The method of claim 8, wherein the plurality of wildcard characters include a plurality of start characters.

10. The method of claim 9, further comprising prepending the plurality of start characters to a corresponding target encoding search pattern.

11. The method of claim 8, wherein the plurality of wildcard characters include a plurality of terminal characters.

12. The method of claim 11, further comprising appending the plurality of terminal characters to a corresponding target encoding search pattern.

13. The method of claim 9, wherein the plurality of target encoding search patterns including the plurality of wildcard characters conform to a regular expression syntax.

14. The method of claim 1, wherein searching comprises invoking a regular expression matching function.

15. The method of claim 1, wherein BLS is equal to 8 and BLT is equal to 6.

16. A computer system comprising:
   one or more computer processors;
   one or more computer readable storage media and program instructions stored on the one or more computer readable storage media, the program instructions comprising instructions to perform:
   receiving a first bit sequence corresponding, to source data having a source encoding bit-length (BLS);
   generating one or more additional bit sequences by shifting the first bit sequence by shift lengths that are equal to a multiple of the source encoding hit-length;
   partitioning the first bit sequence and the one or more additional bit sequences according to a target encoding bit-length (BLT) of a target encoding to provide a plurality of target encoding search patterns; and
   searching a target character string encoded with the target encoding using the plurality of target encoding search patterns.

17. The computer system of claim 16, wherein the plurality of target encoding search patterns comprises P patterns and wherein P is equal to a least common multiple of BLS and BLT divided by BLS.

18. The computer system of claim 17, wherein the program instruction comprise instructions for determining a starting position (I) for a match within the target character string and confirming that a confirmation equation is true wherein the confirmation equation is $(((I-P) \bmod R)=0)$, where R is equal to the least common multiple of BLS and BLT divided by BLT, namely R=LCM(BLS,BLT)/BLT.

19. A computer program product comprising:
one or more computer readable storage media and program instructions stored on the one or more computer readable storage media, the program instructions comprising instructions to perform:
receiving a first bit sequence corresponding to source data, having a source encoding bit-length (BLS);
generating one or more additional bit sequences by shifting the first bit sequence by shift lengths that are equal to a multiple of the source encoding bit-length;
partitioning the first hit sequence and the one or more additional bit sequences according to a target encoding bit-length (BLT) of a target encoding to provide a plurality of target encoding search patterns; and
searching a target character string encoded with the target encoding using the plurality of target encoding search patterns.

20. The computer program product of claim 19, wherein the program instruction comprise instructions to perform:
searching a target character string encoded with the target encoding using the plurality of target encoding search patterns;
determining a starting position (I) for a match within the target character string and confirming that a confirmation equation for the match is true; and
wherein the confirmation equation is $(((I-P) \bmod R)=0)$, where R is equal to a least common multiple of BLS and BLT divided by BLT and where P is equal to the least common multiple of BLS and BLT divided by BLS.

* * * * *